US008806949B2

(12) United States Patent
Niese

(10) Patent No.: US 8,806,949 B2
(45) Date of Patent: Aug. 19, 2014

(54) ELECTROMAGNETIC ULTRASOUND TRANSDUCER

(75) Inventor: Frank Niese, Saarbrücken (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 409 days.

(21) Appl. No.: 13/179,965

(22) Filed: Jul. 11, 2011

(65) Prior Publication Data

US 2012/0014222 A1 Jan. 19, 2012

(30) Foreign Application Priority Data

Jul. 15, 2010 (DE) ........................ 10 2010 027 250

(51) Int. Cl.
*G01N 29/04* (2006.01)

(52) U.S. Cl.
USPC ............................................. 73/643; 73/629

(58) Field of Classification Search
USPC .................................................. 73/643, 629
See application file for complete search history.

(56) References Cited

U.S. PATENT DOCUMENTS 4,232,557 A * 11/1980 Vasile ............................ 73/643
6,009,756 A * 1/2000 Willems et al. ................ 73/643
6,766,694 B2 * 7/2004 Hübschen ....................... 73/643
2011/0179875 A1 7/2011 Salzburger et al.

FOREIGN PATENT DOCUMENTS

DE 42 23 470 A1 * 1/1994
DE 195 43 481 A1 5/1997
DE 696 36 115 T2 11/2006
EP 2 146 204 A1 1/2010

* cited by examiner

*Primary Examiner* — John Chapman, Jr.
(74) *Attorney, Agent, or Firm* — Antonelli, Terry, Stout & Kraus, LLP.

(57) ABSTRACT

An electromagnetic ultrasound transducer is disclosed for receiving linearly polarized horizontal shear waves from an electrically conductive workpiece including a magnetizing unit, which provides a side facing the workpiece, along which a number n of permanent magnets are attached in at least two rows arranged next to one another in such a manner that the magnetic polarities of the magnetic poles which face the side alternate along a row periodically with a period length which corresponds to a trace wavelength $\lambda_s$ and a HF coil arrangement with conductor sections in at least two rows running parallel to one another, through which current can pass in mutually opposite directions.

26 Claims, 2 Drawing Sheets

F

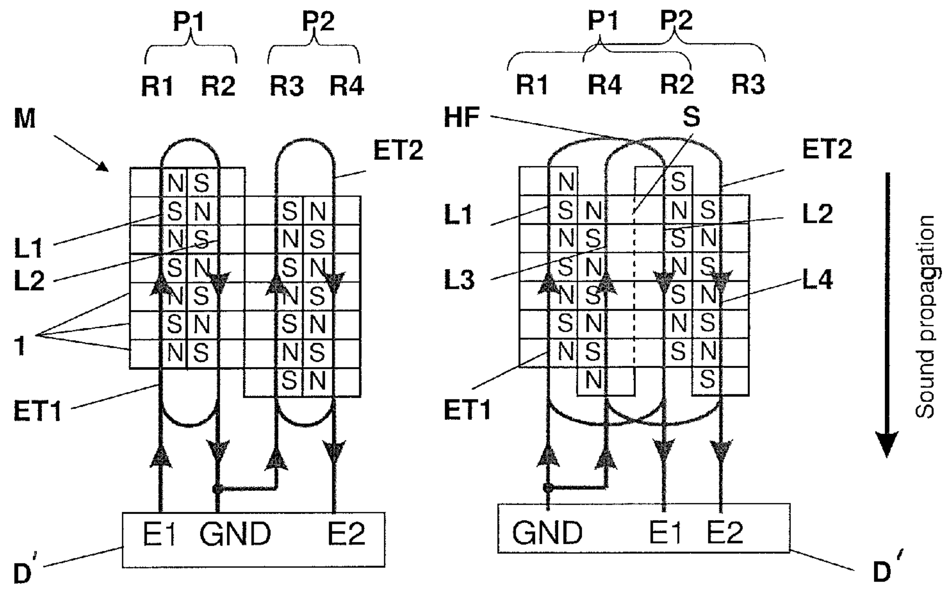
a) Fig. 1 b)
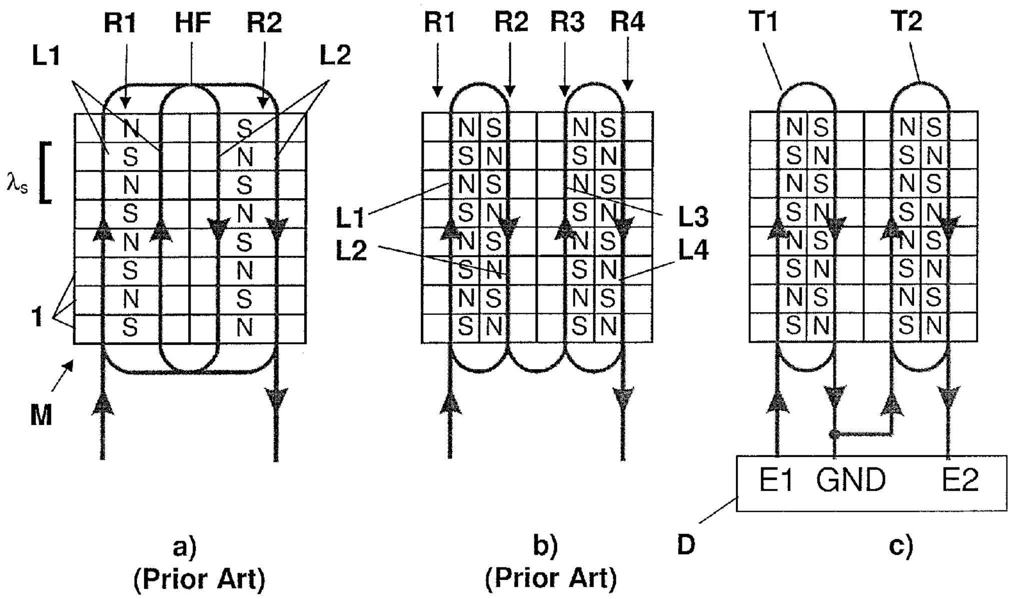
a) (Prior Art) b) (Prior Art) c)
Fig. 2

ELECTROMAGNETIC ULTRASOUND TRANSDUCER

BACKGROUND OF THE INVENTION

1. Field of the Invention

The invention relates to an electromagnetic ultrasound transducer, particularly for receiving linearly polarized shear waves, what are known as SH ultrasound waves, from an electrically conductive workpiece, with a magnetizing unit, which provides a side facing the workpiece, along which a number n of permanent magnets is in each case attached in at least two rows arranged indirectly or directly next to one another in such a manner that the magnetic polarities which face the side and can be assigned to the permanent magnets alternating along a row periodically with a period length which corresponds to a trace wavelength $\lambda_s$ and also with a HF coil arrangement with conductor sections which in each case can be assigned along the at least two rows and run parallel to one another, through which current can pass in mutually opposite directions.

2. Description of the Prior Art

Electromagnetic ultrasound transducers are used for coupling ultrasound waves into or out of workpieces without a coupling means, for example for non-destructive thickness measurement or material investigation, in order to detect material inhomogeneities in the form of cracks or material flaws.

The excitation and also reception principle on which the electromagnetic ultrasound transducers are based, is based on the interaction between an electromagnetic high-frequency field prevailing close to the surface within the workpiece and a static or quasi-static magnetic field laid over the same. With the aid of an electric coil with a predetermined geometry and number of turns arranged close to the surface on the workpiece, which coil is loaded with a HF current pulse/burst signal, eddy currents are induced within what is known as the skin depth of the electrically conductive workpiece, close to the workpiece surface. The two-dimensional distribution of eddy currents is mirror-inverted to the geometry of the electric coil arrangement. If the eddy currents forming within the skin depth of the workpiece are overlaid with a static or quasi-static magnetic field parallel or perpendicular to the material surface, then spatial and temporally periodic elastic material displacements result due to Lorentz forces acting within the workpiece, which are the cause of the damping of ultrasound waves within the workpiece.

The detection or the reception of ultrasound waves takes place in a reciprocal manner. Then an elastic wave propagating within the workpiece close to the surface in the presence of a magnetic field prevailing in this workpiece region generates an electrical field proportional to the displacement speed of the elastic wave, which induces a proportional electrical voltage into an electrical coil resting on the workpiece surface by inductive coupling with the same. The electrical voltage is used as detection signal for the ultrasound wave within the workpiece. The voltage signal levels arising in this process typically lie in the range of a few μV, so there is a requirement for a strong and low-noise pre-amplification of the electrical voltage signals for a reliable signal evaluation and assessment, which additionally are to be subjected to an electrical filtering which is as narrow-banded as possible, in order to generate ultrasound wave signals that can be evaluated.

Typically, the impedance of the electrical coil of an EMUS transducer, which is particularly suitable for the reception of ultrasound waves, is of high-ohmic configuration, in order to generate the greatest possible level of the induced voltage signals from the ultrasound signals. However, due to its electrical inductance, the electrical coil used is also suitable to receive other electromagnetic signals which originate from externally inductively acting electromagnetic signal sources and as such influence the reception and detection of ultrasound waves in an interfering manner. All reception signals inductively converted by the electrical coil into electrical voltage signals, that is both useful and interference signals, pass through the same amplification and filtering chain, so that a differentiation between interference and useful signals is not readily possible.

An ultrasound probe based on the previously described principle of coupling of ultrasound waves into or out of a workpiece without a coupling means is disclosed in DE 42 23 470 C2. The probe generates linearly polarized transverse waves which are both horizontally and vertically polarized. Here, a permanent magnet arrangement is used which produces an inhomogeneous magnetic field in the region of a workpiece close to the surface with a direction in space orientated perpendicularly to the workpiece surface. The permanent magnet arrangement has individual permanent magnet strips lying next to one another with periodically alternating magnetic polarities facing the workpiece surface in each case.

A further arrangement for introduction of sound and detection of ultrasound waves in ferromagnetic workpieces, as for example in pipelines, without a coupling means, is disclosed in DE 195 43 481 C2. In order to be able to damp horizontally polarized transverse waves within a workpiece to be tested with a spatially predetermined directional characteristic, an embodiment illustrated in FIG. 3 of an ultrasound transducer provides a permanent magnet arrangement with a multiplicity of individual permanent magnets arranged in rows which in each case are identically configured in terms of shape and size with the magnetic polarities of periodically alternating along a row. In order to obtain a spatially directed radiation characteristic, the individual permanent magnets in a row are arranged mutually offset to those in the directly adjacent row by half the width of an individual permanent magnet. This corresponds to a quarter of what is known as the trace wavelength $\lambda_s$. In addition, conductor sections of two HF coil arrangements are attached along the individual rows of individual permanent magnets through which current flows in opposite directions. Further details are available from the previously mentioned published document.

Particularly suitable for the reception of SH ultrasound waves from an electrically conductive workpiece are prior art EMUS transducers, of which two embodiments are schematically illustrated in the FIGS. 2*a* and *b*, which in each case show the side of the magnetic arrangement M and the HF coil arrangement HF facing the workpiece.

In the prior art in FIG. 2*a*, permanent magnets 1 are arranged along two rows $R_1$ and $R_2$ in such a manner that the magnetic polarities facing the workpiece periodically alternate in sequence along the rows $R_1$ and $R_2$ N is for magnetic north and S is for magnetic south. A magnet arrangement M illustrated in FIG. 2*a* therefore impresses an non-homogeneous static magnetic field with a trace wavelength $\lambda_s$ into a workpiece, which is determined by the period length, that is the extent of two permanent magnets along a row.

Further, a HF coil arrangement HF is arranged on the side illustrated in FIG. 2*a* of the magnetizing unit M facing the workpiece. During a test use in each case, conductor sections $L_1$, $L_2$ run along the at least two rows $R_1$ and $R_2$ parallel to one another through which current can pass in mutually opposite directions (see current arrows).

In an analogous development to the prior art illustrated in FIG. 2*a*, an embodiment illustrated in FIG. 2*b* provides the arrangement of permanent magnets 1 in four divisible and mutually adjacent rows $R_1$ to $R_4$. In this case also, the HF coil arrangement HF is constructed in such a manner that current can pass through the conductor sections $L_1$ to $L_4$ which in each case run along the rows $R_1$ to $R_4$ in mutually opposite directions. The HF coil arrangement is in this case divided into two part coils $T_1$ and $T_2$ which are connected to one another.

In order to counteract the prior art problem of the simultaneous reception of ultrasound signals and interference signals and to obtain an improved signal to noise ratio, the use of a differential amplifier for signal amplification is the basis of the variant illustrated in FIG. 2*c*. In this context, an attempt has been made to separate the two left and right part coils $T_1$, $T_2$ illustrated in FIG. 2*b* and combine them with a differential amplifier. A design of this type is disclosed in FIG. 2*c*. The connections $E_1$ and $E_2$ of the part coils are connected to the respectively inverting and non-inverting inputs of a differential amplifier D. The two other connections of the part coils $T_1$ and $T_2$ are connected to ground in the illustrated example. This approach does not achieve the desired goal of an effective noise or interference suppression. Although the voltage signals which originate from received ultrasound pulses have a relative phase of 180° at the corresponding poling of the coils $T_1$ and $T_2$ for reception specified in FIG. 2*c*, this is also true for the interference signals which have an identical phase shift of 180°. The only advantage of the configuration variant illustrated in FIG. 2*c* lies in the fact that the voltage amplitude is virtually doubled by the addition of the two reception signals within the framework of the differential amplifier. As a result, further signal evaluation can be improved by the digitizing of the signal levels. Nonetheless, the signal levels of the interference signals are amplified in the same manner, so no improvement of the signal-noise ratios can be achieved.

SUMMARY OF THE INVENTION

The invention is an electromagnetic ultrasound transducer, particularly for receiving linearly polarized horizontal shear waves, which are known as SH ultrasound waves, from an electrically conductive workpiece, with a magnetizing unit. The magnetizing unit has a side facing the workpiece, along which a number n of permanent magnets are attached in at least two rows arranged indirectly or directly next to one another so that the magnetic polarities, which face the side and can be assigned to the permanent magnets, alternate along a row periodically with a period length which corresponds to a trace wavelength $\lambda_s$. The invention also is a HF coil arrangement with conductor sections which in each case can be assigned along the at least two rows and run parallel to one another, through which current can pass in mutually opposite directions in such a manner that an effective suppression of interference signal components becomes possible without considerably increasing and complicating the design for realizing the ultrasound transducer.

An electromagnetic ultrasound transducer constructed in accordance with the invention, particularly for receiving linearly polarized horizontal shear waves, what are known as "SH ultrasound waves", from an electrically conductive workpiece, according to the invention has a number n of second permanent magnets in each case attached along at least two second rows arranged directly or indirectly adjacently to one another in such a manner that the magnetic polarities which face the side and can be assigned to the in each case second permanent magnets alternate along a second row periodically with a period length corresponding to the trace wavelength $\lambda_s$. In each case conductor sections of a further HF coil arrangement are arranged along the at least two second rows running parallel to each other, through which current can pass in mutually opposite directions. The at least two second rows with n second permanent magnets are arranged offset by half a trace wavelength $\lambda_s$ next to the at least two first rows with the n first permanent magnets forming n+1 lines in such a manner that the lines from the second line to the n-th line contain, first and second permanent magnets from the first and second rows, the first line contains exclusively first permanent magnets and the n+1th line contains exclusively second permanent magnets.

The construction of the electromagnetic ultrasound transducer in accordance with the invention includes two HF coil arrangements constructed separately from one another, which can in each case be assigned to a permanent magnet arrangement which can be divided into two rows so that the adjacently arranged permanent magnet arrangements are arranged offset relatively to one another by half a trace wavelength $\lambda_s$ longitudinally relative to the rows. It is possible to fulfil the phase condition for the ultrasound waves, namely for a relative phase of 180°, and also for the interference signals, namely for a relative phase of 0°. In the context of differential amplification by differential amplifier (FIG. 1), the interference signals with a relative phase position of 0° cancel one another out, whereas the ultrasound signals with a relative phase position of 180° are summed, as a result of which their associated voltage amplitude can be doubled. Alternatively to the use of a differential amplifier, the preceding signal evaluation can also take place numerically in the context of a computer-based evaluation unit, in that the received ultrasound and interference signals are digitized and inversely added with a numerical adder.

The electromagnetic ultrasound transducer according to the invention has specific embodiments which are depicted and described in conjunction with FIGS. 1*a* and *b*.

BRIEF DESCRIPTION OF THE DRAWINGS

The invention is described by way of example in the following without limitation of the invention on the basis of exemplary embodiments with reference to the drawings. In the figures:

FIGS. 1*a* and *b* show ultrasound receivers constructed according to the invention.

FIGS. 2*a* to *c* show electromagnetic ultrasound transducers according to the prior art.

DETAILED DESCRIPTION OF THE INVENTION

FIG. 1 schematically shows the lower side view of a magnetizing unit M in with a corresponding HF coil arrangement HF which can be placed onto the surface of a workpiece (not illustrated) which is to be investigated and is an electrically conductive material. The magnetizing unit M is composed of a multiplicity individual permanent magnets 1 which are identically constructed in terms of shape and size. The front sides are shown in FIG. 1*a* with the specified magnetic polarities N and S.

In the exemplary embodiment illustrated in FIG. 1*a*, the magnetizing unit M can be divided into two permanent magnet arrangements $P_1$ and $P_2$. The permanent magnet arrangement $P_1$ has two rows $R_1$ and $R_2$, along which a number n of first individual permanent magnets 1 are arranged in each case. In each case, the magnetic polarities of the individual permanent magnets 1 ending at the front alternate periodically along the rows $R_1$, $R_2$ (N is for magnetic north and S is for magnetic south in this regard). The respectively directly adjacent individual permanent magnets 1 in the rows $R_1$ and $R_2$, that is the individual permanent magnets which lie next to one another in terms of rows, have an opposite magnetic polarity.

Further, a reception coil $ET_1$ is assigned to the magnetic polarity $P_1$, which provides two conductor sections $L_1$ and $L_2$ running parallel to one another in the longitudinal direction of the row, through which current flows in the mutually opposite current directions (see current direction arrows) which is apparent from FIG. 1*a*.

Provided directly adjacent to the permanent magnet arrangement $P_1$ is a second permanent magnet arrangement $P_2$, which likewise provides an identical number n of second permanent magnets 1 along two rows $R_3$ and $R_4$. The permanent magnet arrangement $P_2$ is arranged offset by the width of a permanent magnet 1, that is by half the period length or half the trace wavelength $\lambda_s$ relatively to the permanent magnet arrangement $P_1$.

Figure 3A:
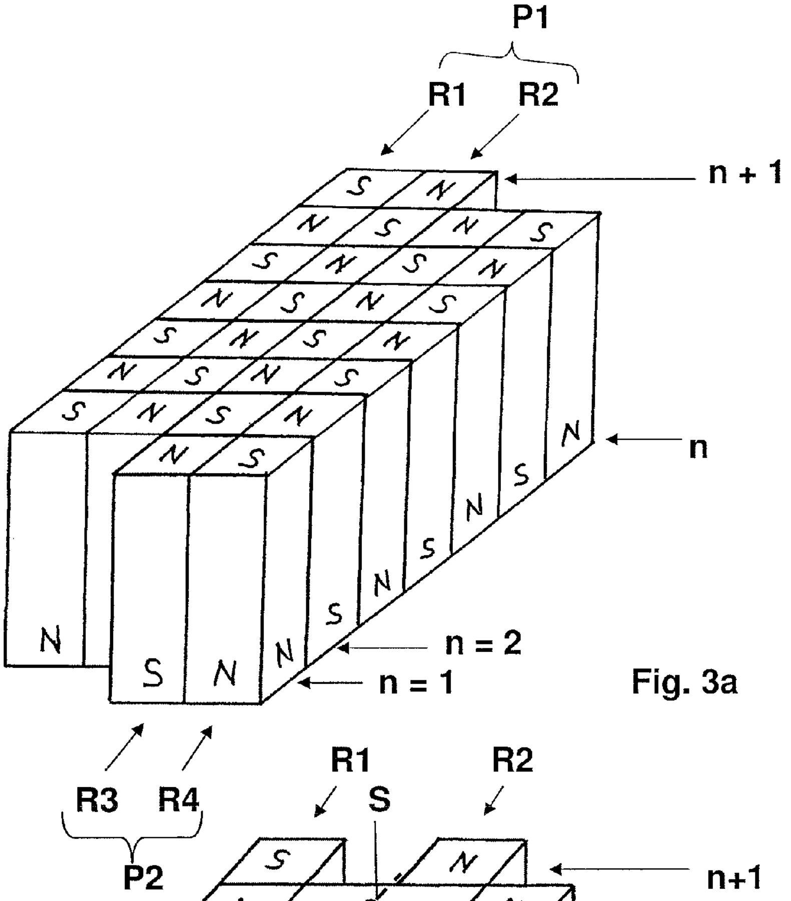
FIGS. 3*a* and 3*b* show perspective illustrations of the magnet arrangements illustrated in FIGS. 1*a* and 1*b*.

It can be seen from FIG. 1*a*, and also from the FIG. 3*a*, which shows a perspective view of the magnet arrangement according to FIG. 1*a*, that n+1 lines are formed by the offset arrangement according to the invention of the first permanent magnets along the rows R1 and R2 compared to the second permanent magnets along the rows R3 and R4, to which lines of the first and/or second permanent magnets can be assigned in the following manner: In the illustrated example, (n=7) permanent magnets are arranged in each of the rows R1, R2, R3, R4. The offset row arrangement according to the invention, with n+1 lines (which equals eight lines) are formed. In the first line (n=1) only second permanent magnets from the rows R3 and R4 are being arranged and in the line n+1 equalling the eighth line, only first permanent magnets from the Rows R1 and R2 are arranged. In the lines from n=2 to n=7, first and second permanent magnets from rows R1, R2, R3 and R4 are arranged.

The construction and arrangement of the reception coil $ET_2$ assigned to the permanent magnet arrangement $P_2$ is the same as the reception coil arrangement $ET_1$. The electrical connections $E_1$ and $E_2$ of the respective reception coils $ET_1$ and $ET_2$ are connected to the inverting or non-inverting input of a differential amplifier which is connected to a numerical evaluation unit which connection of the differential amplifier and evaluation unit is designated as D'. The remaining two connections of the reception coils $ET_1$ and $ET_2$ are at a common ground electrical potential GND.

The ultrasound signals received with the aid of an EMUS transducer arrangement of this type are received with a phase shift of 180° in the reception coils $ET_1$ and $ET_2$ on account of the design, whereas the interference signals in both reception coils $ET_1$ and $ET_2$ do not have any phase lag with the phase of 0°. After the addition of the reception signals with a differential amplifier, the interference signals therefore cancel one another out completely and the ultrasound signal components remain exclusively. As a result, the signal-noise ratio can be improved considerably without having to provide significant additional outlay in terms of measurement technology.

Figure 3B:
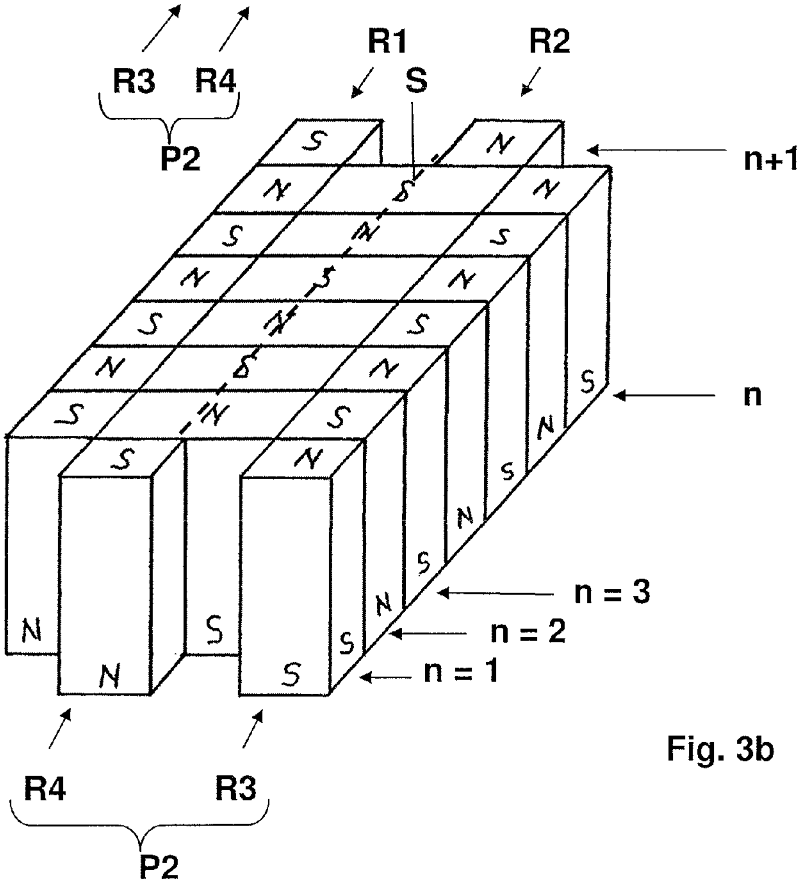

Illustrated in FIG. 1*b* is an alternative embodiment for an EMUS receiving transducer constructed according to the invention, which provides an interleaving of the previously described permanent magnet arrangements $P_1$ and $P_2$ with the associated reception coils $ET_1$ and $ET_2$. FIG. 3*b* shows a perspective illustration relating to this. The row $R_4$ of the second permanent magnet arrangement $P_2$ according to the construction illustrated and described in FIG. 1*a* is located between the rows $R_1$ and $R_2$ of the first permanent magnet arrangement. The row $R_3$ of the permanent magnet arrangement $P_2$ directly adjoins the row $R_2$ on the right. From the perspective illustration in FIG. 3*b*, the line numbers are from n=1 to n equalling n+1, and the permanent magnets arranged in the respective lines can be seen clearly.

The reception coils $ET_1$ and $ET_2$ assigned to the permanent magnet arrangements $P_1$ and $P_2$ are arranged and constructed in an interleaved or overlapping manner, so the associated conductor sections $L_1$ to $L_4$ are assigned to the respective rows $R_1$ to $R_4$.

In this case also, the connections $E_1$ and $E_2$ of the reception coils $ET_1$ and $ET_2$ are connected to the inverting or non-inverting connection of a differential amplifier which is connected to a numerical evaluation unit which connection of differential amplifier and numerical evaluation unit is designated as D'. The two remaining connections are connected to the same ground potential GND.

The embodiment illustrated in FIG. 1*b* has advantages compared to the embodiment shown in FIG. 1*a*. For example, it has a spatially more compact construction and in particular, it has a the substantial overlapping of the reception coils $ET_1$ and $ET_2$, by means of which local interference signals can be received in both reception coils $ET_1$ and $ET_2$ of approximately with the same amplitude and phase. In addition, the basic sensitivity can be improved by a possible combining of the permanent magnetic bodies in the rows $R_4$ and $R_2$. Especially in the case of small magnet dimensions, the magnetic field strength increases very strongly with the magnet volume and the reception amplitude is directly proportional to the magnetic field strength. In this case, the separation lines, which is entered in broken lines, is to be ignored. It is important for the configuration according to the embodiment shown in FIG. 1*b* however, that both the two reception coils $ET_1$ and $ET_2$ and the periodic magnetic arrangement for both permanent magnet arrangements $P_1$ and $P_2$ are structured identically or symmetrically in terms of shape, design and winding direction.

REFERENCE LIST

1 Permanent magnets
$R_1$, $R_2$, $R_3$ and $R_4$ Rows
M Magnetising unit
$T_1$ and $T_2$ Part coils,
$L_1$, $L_2$, $L_3$ and $L_4$ Conductor sections
HF HF coil arrangement
$ET_1$ and $ET_2$ Reception coils
$P_1$ and $P_2$ Permanent magnet arrangement

The invention claimed is:

1. An electromagnetic ultrasound transducer for receiving linearly polarized horizontal shear waves from an electrically conductive workpiece comprising:

a magnetizing unit with a side facing the workpiece, along which a number n of first permanent magnets are attached in each of at least two first rows so that magnetic polarities of the magnets facing the side of the workpiece alternate periodically along the first rows with a period length corresponding to a trace wavelength λs with n being an integer greater than 1;

a HF coil with conductor sections disposed along at least two first rows running parallel to each other and through which current can pass in mutually opposite directions;

n second permanent magnets in each of at least two second rows with magnetic polarities of the magnets facing the side of the workpiece so that the n second permanent magnets periodically alternate along the at least two second rows with a period length corresponding to the trace wavelength λs;

an additional HF coil with conductor sections disposed along at least two second rows running parallel to each other and through which current can pass in mutually opposite directions; and wherein the at least two second rows of the n second permanent magnets are offset by half a trace wavelength λs from the at least two first rows of the n first permanent magnets to form n+1 lines so that a second line to a nth line contains first and second permanent magnets from the first and second rows, a first line contains only first permanent magnets and a n+1th line contains only second permanent magnets;

the two first rows of the n first permanent magnets are located next to one another; and the two second rows of n second permanent magnets are located next to one another and adjoin one of the two first rows of the n first permanent magnets.

2. An electromagnetic ultrasound transducer according to claim 1, wherein:

the n first and second permanent magnets in the first and second rows are of an identical shape and size.

3. An electromagnetic ultrasound transducer according to claim 1, wherein:

the HF coils each include at least one continuous coil winding with two conductor sections running parallel to one another and are identical in shape, number of windings and winding direction.

4. An electromagnetic ultrasound transducer according to claim 2, wherein:

the HF coils each include at least one continuous coil winding with two conductor sections running parallel to one another and are identical in shape, number of windings and winding direction.

5. An electromagnetic ultrasound transducer according to claim 1, comprising:

a differential amplifier with an inverting input and a non-inverting input;

the HF coils each include two line connections, with one line connection of one of the HF coils being connected to the inverting input and one line connection of the another HF coils being connected to the non-inverting input;

the other line connections of the HF coils being connected to one another or are at an identical electrical potential; and wherein interference induced in the coils is cancelled.

6. An electromagnetic ultrasound transducer according to claim 2, comprising:

a differential amplifier with an inverting input and a non-inverting input;

the HF coils each include two line connections, with one line connection of one of the HF coils being connected to the inverting input and one line connection of the another HF coils being connected to the non-inverting input;

the other line connections of the HF coils being connected to one another or are at an identical electrical potential; and wherein interference induced in the coils is cancelled.

7. An electromagnetic ultrasound transducer according to claim 3, comprising:

a differential amplifier with an inverting input and a non-inverting input;

the HF coils each include two line connections, with one line connection of one of the HF coils being connected to the inverting input and one line connection of the another HF coils being connected to the non-inverting input;

the other line connections of the HF coils being connected to one another or are at an identical electrical potential; and wherein interference induced in the coils is cancelled.

8. An electromagnetic ultrasound transducer according to claim 4, comprising:

a differential amplifier with an inverting input and a non-inverting input;

the HF coils each include two line connections, with one line connection of one of the HF coils being connected to the inverting input and one line connection of the another HF coils being connected to the non-inverting input;

the other line connections of the HF coils being connected to one another or are at an identical electrical potential; and wherein interference induced in the coils is cancelled.

9. An electromagnetic ultrasound transducer according to claim 1, wherein:

one line connection of the HF coil and one line connection of the additional HF coil are connected to an A/D converter which is connected to a numerical evaluation unit for inversely adding the signal components of both line connections.

10. An electromagnetic ultrasound transducer according to claim 2, wherein:

one line connection of the HF coil and one line connection of the additional HF coil are connected to an A/D converter which is connected to a numerical evaluation unit for inversely adding the signal components of both line connections.

11. An electromagnetic ultrasound transducer according to claim 3, wherein:

one line connection of the HF coil and one line connection of the additional HF coil are connected to an A/D converter which is connected to a numerical evaluation unit for inversely adding the signal components of both line connections.

12. An electromagnetic ultrasound transducer according to claim 4, wherein:

one line connection of the HF coil and one line connection of the additional HF coil are connected to an A/D converter which is connected to a numerical evaluation unit for inversely adding the signal components of both line connections.

13. An electromagnetic ultrasound transducer according to claim 5, wherein:

one line connection of the HF coil and one line connection of the additional HF coil are connected to an A/D converter which is connected to a numerical evaluation unit for inversely adding the signal components of both line connections.

14. An electromagnetic ultrasound transducer for receiving linearly polarized horizontal shear waves from an electrically conductive workpiece comprising:

a magnetizing unit with a side facing the workpiece, along which a number n of first permanent magnets are attached in each of at least two first rows so that magnetic polarities of the magnets facing the side of the workpiece alternate periodically along the first rows with a period length corresponding to a trace wavelength λs with n being an integer greater than 1;

a HF coil with conductor sections disposed along at least two first rows running parallel to each other and through which current can pass in mutually opposite directions;

n second permanent magnets in each of at least two second rows with magnetic polarities of the magnets facing the side of the workpiece so that the n second permanent magnets periodically alternate along the at least two second rows with a period length corresponding to the trace wavelength λs;

an additional HF coil with conductor sections disposed along at least two second rows running parallel to each other and through which current can pass in mutually opposite directions; and wherein the at least two second rows of the n second permanent magnets are offset by half a trace wavelength λs from the at least two first rows of the n first permanent magnets to form n+1 lines so that a second line to a nth line contains first and second permanent magnets from the first and second rows, a first line contains only first permanent magnets and a n+1th line contains only second permanent magnets; and the first and second rows of the n permanent magnets are interleaved in an alternating sequence and are located next to one another.

15. An electromagnetic ultrasound transducer according to claim 14, wherein:

the n first and second permanent magnets in the first and second rows are of an identical shape and size.

16. An electromagnetic ultrasound transducer according to claim 14, wherein:

the HF coils each include at least one continuous coil winding with two conductor sections running parallel to one another and are identical in shape, number of windings and winding direction.

17. An electromagnetic ultrasound transducer according to claim 15, wherein:

the HF coils each include at least one continuous coil winding with two conductor sections running parallel to one another and are identical in shape, number of windings and winding direction.

18. An electromagnetic ultrasound transducer according to claim 14, comprising:

a differential amplifier with an inverting input and a non-inverting input;

the HF coils each include two line connections, with one line connection of one of the HF coils being connected to the inverting input and one line connection of the another HF coils being connected to the non-inverting input;

the other line connections of the HF coils are connected to one another or are at an identical electrical potential; and wherein interference induced in the coils is cancelled.

19. An electromagnetic ultrasound transducer according to claim 15, comprising:

a differential amplifier with an inverting input and a non-inverting input;

the HF coils each include two line connections, with one line connection of one of the HF coils being connected to the inverting input and one line connection of the another HF coils being connected to the non-inverting input;

the other line connections of the HF coils are connected to one another or are at an identical electrical potential; and wherein interference induced in the coils is cancelled.

20. An electromagnetic ultrasound transducer according to claim 16, comprising:

a differential amplifier with an inverting input and a non-inverting input;

the HF coils each include two line connections, with one line connection of one of the HF coils being connected to the inverting input and one line connection of the another HF coils being connected to the non-inverting input;

the other line connections of the HF coils are connected to one another or are at an identical electrical potential; and wherein interference induced in the coils is cancelled.

21. An electromagnetic ultrasound transducer according to claim 17, comprising:

a differential amplifier with an inverting input and a non-inverting input;

the HF coils each include two line connections, with one line connection of one of the HF coils being connected to the inverting input and one line connection of the another HF coils being connected to the non-inverting input;

the other line connections of the HF coils are connected to one another or are at an identical electrical potential; and wherein interference induced in the coils is cancelled.

22. An electromagnetic ultrasound transducer according to claim 14, wherein:

one line connection of the HF coil and one line connection of the additional HF coil are connected to an A/D converter which is connected to a numerical evaluation unit for inversely adding the signal components of both line connections.

23. An electromagnetic ultrasound transducer according to claim 15, wherein:

one line connection of the HF coil and one line connection of the additional HF coil are connected to an A/D converter which is connected to a numerical evaluation unit for inversely adding the signal components of both line connections.

24. An electromagnetic ultrasound transducer according to claim 16, wherein:

one line connection of the HF coil and one line connection of the additional HF coil are connected to an A/D converter which is connected to a numerical evaluation unit for inversely adding the signal components of both line connections.

25. An electromagnetic ultrasound transducer according to claim 17, wherein:

one line connection of the HF coil and one line connection of the additional HF coil are connected to an A/D converter which is connected to a numerical evaluation unit for inversely adding the signal components of both line connections.

26. An electromagnetic ultrasound transducer according to claim 18, wherein:

one line connection of the HF coil and one line connection of the additional HF coil are connected to an A/D converter which is connected to a numerical evaluation unit for inversely adding the signal components of both line connections.

* * * * *